United States Patent
Atzpadin et al.

(10) Patent No.: US 9,947,096 B2
(45) Date of Patent: Apr. 17, 2018

(54) HYBRID RECURSIVE ANALYSIS OF SPATIO-TEMPORAL OBJECTS

(71) Applicant: Fraunhofer-Gesellschaft zur Foerderung der angewandten Forschung e.V., Munich (DE)

(72) Inventors: Nicole Atzpadin, Neuendorf (DE); Wolfgang Waizenegger, Berlin (DE); Oliver Schreer, Berlin (DE); Ingo Feldmann, Berlin (DE); Peter Kauff, Berlin (DE); Peter Eisert, Berlin (DE)

(73) Assignee: FRAUNHOFER-GESELLSCHAFT ZUR FOERDERUNG DER ANGEWANDTEN FORSCHUNG e.V., Munich (DE)

( * ) Notice: Subject to any disclaimer, the term of this patent is extended or adjusted under 35 U.S.C. 154(b) by 715 days.

(21) Appl. No.: 14/287,274

(22) Filed: May 27, 2014

(65) Prior Publication Data

US 2014/0270486 A1 Sep. 18, 2014

Related U.S. Application Data

(63) Continuation of application No. PCT/EP2012/073506, filed on Nov. 23, 2012.
(Continued)

(51) Int. Cl.
*G06T 1/00* (2006.01)
*G06T 7/00* (2017.01)
(Continued)

(52) U.S. Cl.
CPC ............ *G06T 7/004* (2013.01); *G06T 7/593* (2017.01); *G06T 7/70* (2017.01); *G06T 7/97* (2017.01);
(Continued)

(58) Field of Classification Search
CPC .......... G06T 7/004; G06T 7/593; G06T 7/70; G06T 7/97; G06T 2207/10012; G06T 2207/10028; G06T 2207/20076
See application file for complete search history.

(56) References Cited

U.S. PATENT DOCUMENTS

2006/0050952 A1* 3/2006 Blais .................. G01S 17/89
382/154

OTHER PUBLICATIONS

Feldmann et al, "Multi-view depth estimation based on visual-hull enhanced Hybrid Recursive Matching for 3D video conference systems", IEEE, 2009, pp. 745-748.*

(Continued)

*Primary Examiner* — Edward Park
(74) *Attorney, Agent, or Firm* — Keating & Bennett, LLP

(57) ABSTRACT

A method for generating 3D-information from multiple images showing a 3D scene from multiple perspectives has: providing at least two hypotheses for the 3D-information; performing a multi-hypotheses test by matching the at least two hypotheses to the multiple images and determining a test-result hypothesis that fulfills a particular matching criterion; updating the test-result hypothesis by varying a parameter set of the test-result hypothesis to further improve the matching criterion or another criterion; and determining the 3D-information on the basis of the parameter set of a resulting hypothesis provided by the action of updating the test-result hypothesis. A corresponding computer readable digital storage medium and a 3D-information generator are also described. Further embodiments perform a correspondence analysis between projections of spatio-temporal objects (STO) in multiple images to select a particular spatio-temporal object on the basis of said correspondence analysis.

20 Claims, 4 Drawing Sheets

Related U.S. Application Data

(60) Provisional application No. 61/564,916, filed on Nov. 30, 2011.

(51) Int. Cl.
*G06T 7/70* (2017.01)
*G06T 7/593* (2017.01)

(52) U.S. Cl.
CPC ............... *G06T 2207/10012* (2013.01); *G06T 2207/10028* (2013.01); *G06T 2207/20076* (2013.01)

(56) References Cited

OTHER PUBLICATIONS

Zimmermann et al, "Multiview 3D Tracking with an Incrementally Constructed 3D Model", IEEE, 2006, pp. 1-8.*

Official Communication issued in International Patent Application No. PCT/EP2012/073506, dated Mar. 15, 2013.

Feldmann et al., "Multi-View Depth Estimation Based on Visual-Hull Enhanced Hybrid Recursive Matching for 3D Video Conferences Systems", 2009 16th IEEE International Conference on Image Processing (ICIP), IEEE, Nov. 7, 2009, pp. 745-748.

Waizenegger et al., "Patch-Sweeping with Robust Prior for High Precision Depth Estimation in Real-Time Systems", 2009 16th IEEE International Conference on Image Processing (ICIP), IEEE, Sep. 11, 2011, pp. 881-884.

Waizenegger et al., "Real-time Patch Sweeping for High-Quality Depth Estimation in 3D Videoconferencing Applications", Proceedings of SPIE, vol. 7871, Feb. 10, 2011, p. 7871E-1-7871E-10.

Atzpadin et al., "Stereo Analysis by Hybrid Recursive Matching for Real-Time Immersive Video Conferencing", IEEE Trans. on Circuits and Systems for Video Technology, Special Issue on Immersive Telecommunications, vol. 14, No. 4, Mar. 2004, pp. 321-334.

* cited by examiner

HYBRID RECURSIVE ANALYSIS OF SPATIO-TEMPORAL OBJECTS

CROSS-REFERENCE TO RELATED APPLICATIONS

This application is a continuation of copending International Application No. PCT/EP2012/073506, filed Nov. 23, 2012, which is incorporated herein by reference in its entirety, and additionally claims priority from U.S. Provisional Application No. 61/564,916, filed Nov. 30, 2011, which is also incorporated herein by reference in its entirety.

BACKGROUND OF THE INVENTION

One major objective of computer vision algorithms is to create spatial and temporal consistent 3D information from multiple cameras and/or multi-sensor setups.

Patch sweeping is an extension of the well-known plane sweeping approaches. In recent years, plane sweeping was considered as one of the most promising approaches for real-time depth estimation, but the estimation quality is limited (Colins, R. T. (1996): "A Space-Sweep approach to true Multi-Image matching", *Computer Vision and Pattern Recognition, IEEE Computer Society Conference*, vol. 0 p. 358).

Simultaneously, patch based techniques (Furukawa, Y. Ponce, J. (2007): "Accurate, dense, and robust Multi-View stereopsis", *Computer Vision and Pattern Recognition, CVPR 07*) turned out to be among the most accurate but time consuming 3D reconstruction methods (Seitz, S. M., Curless, B., Diebel, J., Scharstein, D., Szeliski, R. (2006): "*A comparison and evaluation of Multi-View Stereo reconstruction algorithms*", Proceedings of the 2006 IEEE Computer Society Conference on Computer Vision and Pattern Recognition, IEEE Computer Society). Inspired by the contrary properties of the plane sweeping and patch based approaches, patch sweeping emerged as a symbiotic fusion of these two techniques.

Patch sweeping assumes that a 3D object surface can be described with quadratic surface elements, which are also known as surflets or spatial patches. In order to estimate the depth of an object for a reference camera or the object surface, several oriented spatial patches along the viewing rays of this reference camera have to be tested (see FIG. 1).

FIG. 1 schematically illustrates the principle of Patch Sweeping. Several surflet orientations are evaluated.

An extended hybrid recursive matching (HRM) was proposed by N. Atzpadin, P. Kauff, O. Schreer in 2004 in the article "Stereo Analysis by Hybrid Recursive Matching for Real-Time Immersive Video Conferencing", *IEEE Trans. on Circuits and Systems for Video Technology, Special Issue on Immersive Telecommunications*, Vol. 14, No. 4, 321-334. European Patent Application EP 1 229 741 A1 by Atzpadin, N., Karl, M., Kauff, P., Schreer, O. (2002) describes a "Process for Real-Time Correspondence Analysis of Image Features in Corresponding Video Images". The article "True-Motion Estimation with 3-D Recursive Search Block Matching" by De Haan, G., Biezen, P. W. A. C., Huijgen, H., Ojo, O. A., *IEEE Trans. on Circuits and Systems for Video Technology*, (1993), Vol. 3, No. 5, 368-379 describes further related research.

One major challenge of conventional patch sweeping is to define the search range in the parameter space in order to get results of high depth resolution but with a reasonable computational effort.

SUMMARY

According to an embodiment, a method for generating 3D-information from multiple images showing a 3D scene from multiple perspectives may have the steps of: providing at least two hypotheses for the 3D-information; performing a multi-hypotheses test by matching the at least two hypotheses to the multiple images and determining a test-result hypothesis that fulfills a particular matching criterion, wherein the multi-hypotheses test has determining projections of at least two 3D spatio-temporal objects defined by the at least two hypotheses on a plurality of image planes corresponding to the multiple images and performing a correspondence analysis between the projections in the multiple images to determine the test-result hypothesis; updating the test-result hypothesis by varying a parameter set of the test-result hypothesis to further improve the matching criterion or another criterion; and determining the 3D-information on the basis of the parameter set of a resulting hypothesis provided by the action of updating the test-result hypothesis.

According to another embodiment, a 3D-information generator may have: an interface for receiving multiple images showing a 3D scene from multiple perspectives; a hypotheses provider for providing at least two hypotheses for the 3D-information; a multi-hypotheses tester for performing a multi-hypotheses test by matching the at least two hypotheses to the multiple images and determining a test-result hypothesis that fulfills a particular matching criterion, the multi-hypotheses tester having a projection calculator for determining projections of at least two 3D spatio-temporal objects defined by the at least two hypotheses on a plurality of image planes corresponding to the multiple images, and a correspondence analyzer for performing a correspondence analysis between the projections in the multiple images to determine the test result hypothesis; a hypothesis updater for updating the test-result hypothesis by varying a parameter set of the test-result hypothesis to further improve a fulfillment of the matching criterion or another criterion; and a 3D-information interface for providing the 3D-information on the basis of the parameter set of a resulting hypothesis provided by the hypothesis updater.

According to still another embodiment, a method for generating 3D-information from multiple images showing a 3D scene from multiple perspectives may have the steps of: providing a plurality of spatio-temporal object parameter sets, each spatio-temporal object parameter set having object parameters describing a 3D spatio-temporal object of a plurality of 3D spatio-temporal objects; determining projections of the plurality of spatio-temporal objects on a plurality of image planes corresponding to the multiple images using the plurality of spatio-temporal object parameter sets; performing a correspondence analysis between the projections in the multiple images; selecting a particular spatio-temporal object parameter set from the plurality of spatio-temporal object parameter sets on the basis of a result of the correspondence analysis; and determining the 3D-information on the basis of the object parameters of the particular spatio-temporal object parameter set.

According to another embodiment, a 3D-information generator for generating 3D-information from multiple images showing a 3D scene from multiple perspectives may have: a parameter set provider for providing a plurality of spatio-temporal object parameter sets, each spatio-temporal object parameter set having object parameters describing a 3D spatio-temporal object of a plurality of 3D spatio-temporal objects; a projection calculator for determining projections of the plurality of spatio-temporal objects on a plurality of image planes corresponding to multiple images using the plurality of spatio-temporal object parameter sets; a correspondence analyzer for performing a correspondence analysis between the projections in the multiple images; a parameter set selector for selecting a particular spatio-temporal object parameter set from the plurality of spatio-temporal object parameter sets on the basis of a result of the correspondence analysis; and a 3D-information interface for providing the 3D-information on the basis of the object parameters of the particular spatio-temporal object parameter set.

Another embodiment may have a computer readable digital storage medium having stored thereon a computer program having a program code for performing, when running on a computer, the above methods for generating 3D-information from multiple images.

Embodiments of the present invention provide a method for generating 3D-information from multiple images showing a 3D scene from multiple perspectives. The method comprises providing at least two hypotheses for the 3D-information and performing a multi-hypotheses test by matching the at least two hypotheses to the multiple images and determining a test-result hypothesis that fulfills a particular matching criterion. The method further comprises updating the test-result hypothesis by varying a parameter set of the test-result hypothesis to further improve the matching criterion or another criterion. The method also comprises determining the 3D-information on the basis of the parameter set of a resulting hypothesis provided by the action of updating the test-result hypothesis.

Further embodiments provide a computer readable digital storage medium having stored there on a computer program having a program code for performing, when running on a computer, a method for generating 3D-information from multiple images showing a 3D scene from multiple perspectives. The method comprises providing at least two hypotheses for the 3D-information and performing a multi-hypotheses test by matching the at least two hypotheses to the multiple images and determining a test-result hypothesis that fulfills a particular matching criterion. The method further comprises updating the test-result hypothesis by varying a parameter set of the test-result hypothesis to further improve the matching criterion or another criterion. The method also comprises determining the 3D-information on the basis of the parameter set of a resulting hypothesis provided by the action of updating the test-result hypothesis.

Further embodiments of the present invention provide a 3D-information generator. The 3D-information generator comprises an interface for receiving multiple images showing a 3D scene from multiple perspectives, a hypotheses provider for providing at least two hypotheses for the 3D-information, and a multi-hypotheses tester for performing a multi-hypotheses test by matching the at least two hypotheses to the multiple images and determining a test-result hypothesis that fulfills a particular matching criterion. The 3D-information generator further comprises a hypothesis updater for updating the test-result hypothesis by varying a parameter set of the test-result hypothesis to further improve the matching criterion or another criterion. The 3D-information generator also comprises a 3D-information interface for providing the 3D-information on the basis of the parameter set of a resulting hypothesis provided by the hypothesis updater.

According to further embodiments, a method for generating 3D-information from multiple images showing a 3D scene from multiple perspectives comprises: providing a plurality of spatio-temporal object parameter sets, each spatio-temporal object parameter set comprising object parameters describing a 3D spatio-temporal object of a plurality of 3D spatio-temporal objects. The method further comprises determining projections of the plurality of spatio-temporal objects on a plurality of image planes corresponding to the multiple images using the plurality of spatio-temporal object parameter sets. The method also comprises performing a correspondence analysis between the projections in the multiple images. Furthermore, the method comprises selecting a particular spatio-temporal object parameter set from the plurality of spatio-temporal object parameter sets on the basis of a result of the correspondence analysis. The 3D-information is then determined on the basis of the object parameters of the particular spatio-temporal object parameter set.

Further embodiments relate to a computer-readable digital storage medium that has stored thereon a computer program having a program code for performing, when running on a computer, the method mentioned above for generating 3D-information from multiple images showing a 3D-scene from multiple perspectives.

According to further embodiments, a 3D-information generator is provided which comprises a parameter set provider for providing a plurality of spatio-temporal object parameter sets. Each spatio-temporal object parameter set comprises object parameters describing a 3D spatio-temporal object of a plurality of 3D spatio-temporal objects. The 3D-information generator further comprises a projection calculator for determining projections of the plurality of spatio-temporal objects on a plurality of images planes corresponding to the multiple images using the plurality of spatio-temporal object parameter sets. A correspondence analyzer is provided for performing a correspondence analysis between the projections in the multiple images. The 3D-information generator also comprises a parameter set selector for selecting a particular spatio-temporal object parameter set from the plurality of spatio-temporal object parameter sets on the basis of a result of the correspondence analysis. Furthermore, the 3D-information generator comprises a 3D-information interface for providing the 3D-information on the basis of the object parameters of the particular spatio-temporal object parameter set.

The presented method exploits the advantages of a fast hybrid recursive disparity estimation scheme with the accuracy offered by a patch sweeping approach. Moreover, conventional blocks from block-matching are replaced by spatio-temporal objects, which offer a more general representation of the 3D scene.

As mentioned above, one major challenge of conventional patch sweeping is to define the search range in the parameter space in order to get results of high depth resolution but with a reasonable computational effort. This search range problem is solved by the hybrid recursive analysis, which is instead based on a set of a few hypotheses lowering the computational effort significantly.

DETAILED DESCRIPTION OF THE INVENTION

Definition of a Spatio-Temporal Object

For the purpose of the subsequent description, a so-called spatio-temporal object (STO) is introduced, which is considered to be an extension of standard patches mentioned above. A spatio-temporal object is a time varying description of an arbitrary 3D shape containing parameters such as 3D position, 3D orientation, deformation and material properties like object transparency or reflectance and possibly many more. Due to the time-varying nature of an STO, it can be also considered as an arbitrary formed and deformable time-dependent 3D object. Hence, a STO represents a temporarily varying 3D Object defined by a parameter vector. In order to compare a STO with 2D projections in different images, the projection of a STO is used.

Hybrid Recursive Analysis Based of Spatio-Temporal Objects

The hybrid recursive analysis is an extension of the hybrid recursive matching (HRM), which was developed at Fraunhofer HHI (Heinrich Hertz Institut). The HRM is defined for a stereo setup dealing with disparity vectors. In contrast to this, the proposed hybrid recursive analysis enhances stereo to multi-view setups and uses a more general definition of so-called spatio-temporal objects (STO) instead of disparities.

Hence, the proposed algorithm replaces the test of several patches with a large number of parameter combinations like position, orientation, deformation etc. by an efficient multi hypotheses test of only a limited, relatively small number of hypotheses (or corresponding spatio-temporal object parameter sets) in order to exploit the fact that the patches usually do not change significantly in space and time. The 3D patches in the local neighborhood and from the former image define these new hypotheses described by a parameter vector.

The hybrid recursive analysis uses previous processing results in order to create a spatial and temporal consistent representation of the 3D scene. This concept of recursive analysis avoids high search ranges via an efficient hypothesis analysis. The rationale is that such hypotheses are the most likely to provide a good estimate of the 3D structure for the current pixel and its neighbourhood. Hypotheses are defined by STOs, which offers per definition temporal and spatial properties.

Figure 1:
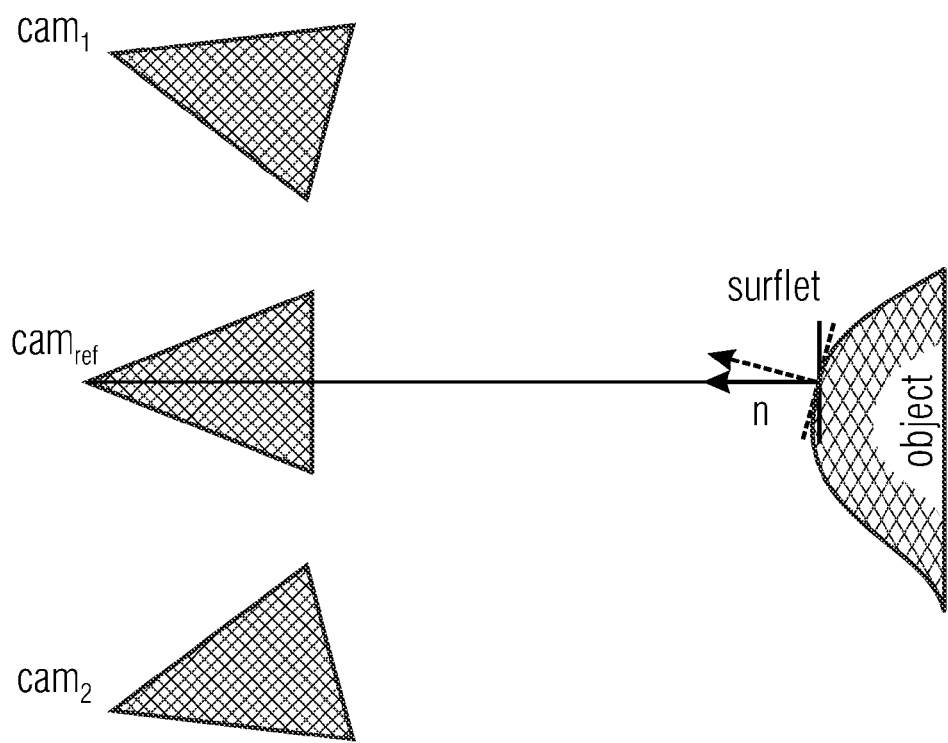
FIG. 1 shows a schematic representation of the principle of patch sweeping.
Figure 2:
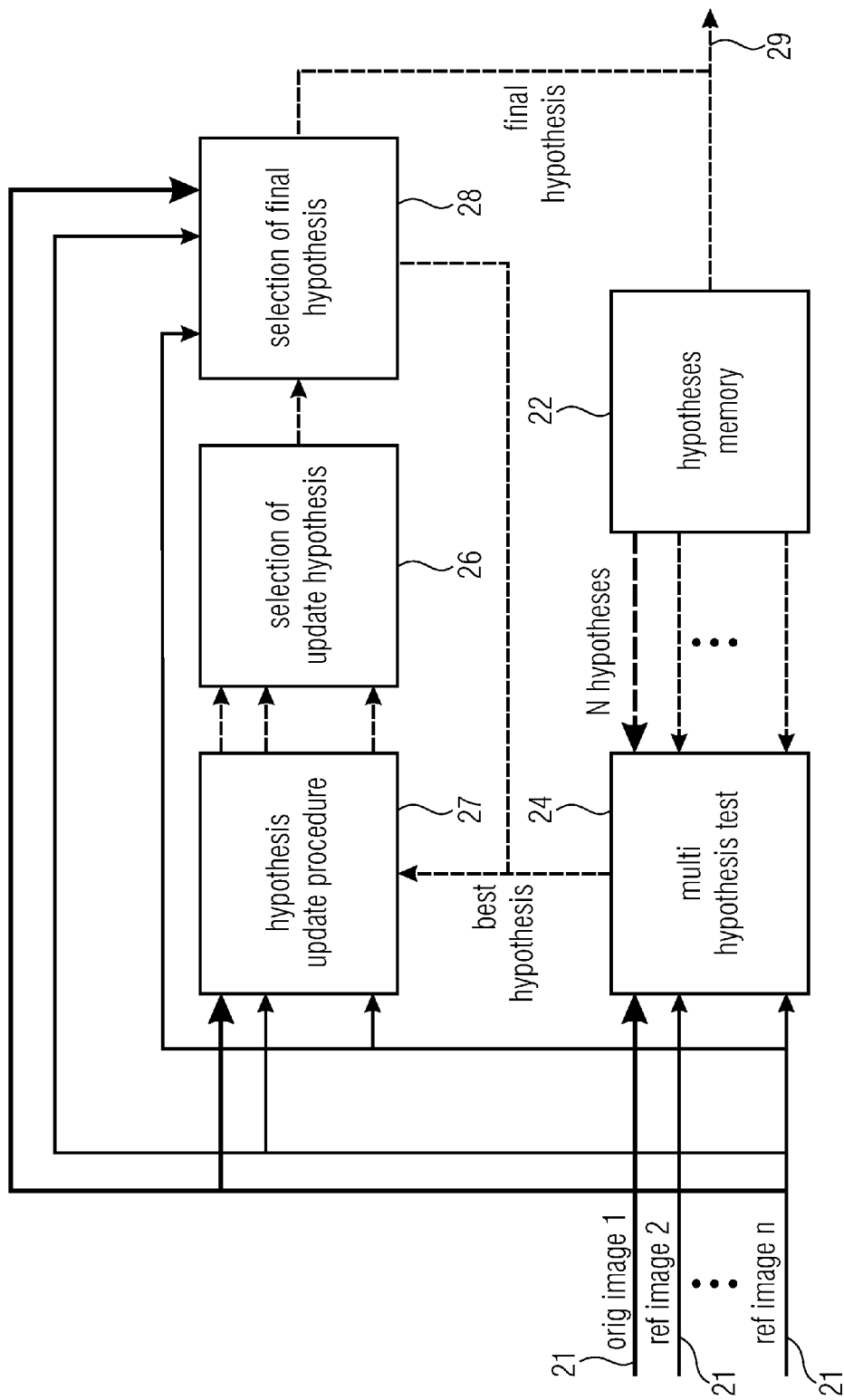
FIG. 2 schematically illustrates the principle of hybrid recursive analysis.

An example of the overall hybrid recursive analysis based on hypotheses of spatio-temporal objects is depicted in FIG. 2. The input of the algorithm (at an input interface 21) are multiple views or images, whereby one image is acting as original image and the remaining ones are so-called reference images. Hence, this approach is extendible to the multi-view scenario. Typically, the multiple views/images show a 3D scene from multiple perspectives, wherein each of the multiple views/images corresponds to one of the perspectives. When the proposed hybrid recursive analysis is implemented in the form of a 3D-information generator, the 3D-information generator may comprise an interface for receiving the multiple images showing the 3D scene from multiple perspectives.

The validation of a limited number of given hypothesis is evaluated in the multi hypotheses test 24. Typically at least two hypotheses for the 3D-information are provided to the multi-hypotheses test 24 in order to be tested against the information contained in the multiple views/images. In the 3D-information generator, a hypotheses provider 22 (in the case of FIG. 2, a hypotheses memory) is configured for providing the at least two hypotheses to the multi-hypotheses tester 24. The STO of each hypothesis is projected into the image planes of two or multiple cameras and compared with the corresponding STO projections in the actual acquired images by correspondence analysis. During this process, simplified versions of the STO projection may be used, such as simplified STO projection shapes in the image planes. The best hypothesis is selected by a winner-takes-all selection among all tested matching scores. The correspondence analysis may provide a measure of match for a particular hypothesis and the multiple views. On the basis of the measure of match, a matching criterion for this particular hypothesis may be evaluated. The matching criterion may define which of the hypotheses matches the information contained in the multiple views best. Alternatively, an absolute threshold for the measure of matching may be defined, and the first hypothesis, or any hypotheses, having a measure of matching exceeding the threshold fulfill(s) the matching criterion. The multi-hypotheses test 24 provides a test-result hypothesis (or possibly several test-result hypotheses) that fulfills the particular matching criterion. In FIG. 2, the test-result hypothesis provided by the hypotheses test 24 is referred to as "best hypothesis".

After that, a hypotheses update procedure 27 delivers a new hypothesis, resulting from a multi-dimensional optimization step, as well as based on a hypothesis confidence measure. For example, the hypotheses update procedure may vary the parameter set of the test-result hypothesis to further improve the matching criterion (i.e., to obtain a higher/better degree of matching between the updated test-result hypothesis and the actual 3D object in the 3D scene acquired by the camera). The 3D-information generator comprises a hypothesis updater for updating the test-result hypothesis. This additional hypothesis is tested against the best hypothesis from multi hypotheses test 24. This is typically unavoidable due to the fact that the algorithm has to initialize and the hypotheses have to be adapted to the current image especially in regions with complex 3D structure or in high dynamic regions. In particular, an action of comparing an updated test-result and the test-result hypothesis with respect to the particular matching criterion or a further matching criterion (e.g., the confidence) may be performed. The updated test-result hypothesis or the test-result hypothesis may then be chosen as the resulting hypothesis in dependence on a result of the comparison.

The 3D-information may then be determined on the basis of the parameter set of a resulting hypothesis (final hypothesis in FIG. 2, e.g. provided by a block "selection of final hypothesis" 28) provided by the action of updating the test-result hypothesis. The 3D-information generator typically comprises a 3D-information interface 29 for providing the 3D-information on the basis of the parameter set of the resulting hypothesis provided by the hypothesis updater.

The whole algorithm can be divided into three stages:
1. In the multi hypotheses test 24, a small number of hypotheses are evaluated for the current position;
2. the hypothesis with the best result is chosen as the start for the hypothesis update and refinement procedure 27, which yields an additional hypothesis;
3. the final result is obtained by comparing the hypothesis from the update procedure with the best hypothesis yielding from the multi hypotheses test.

Only a very limited number of hypotheses are tested in the hypotheses test 24 to find the best hypothesis of a STO for the actual position. In contrast to standard algorithms no search area is defined. In contrast to the stereo HRM the hypotheses are no longer checked in a single image pair but tested in all existing camera images in parallel.

The hybrid analysis scheme has two main advantages in comparison to common approaches. The recursive structure speeds up the analysis dramatically. The combined choice of spatial and temporal hypotheses yields spatially and temporally consistent 3D structure due to an efficient strategy of testing particular hypotheses.

As can be seen in FIG. 2, a hypotheses memory 22 may be provided from which selected hypotheses may be retrieved to provide the at least two hypotheses for the 3D-information to the multi-hypotheses test 24. The selected hypotheses retrieved from the hypotheses memory 22 are relative to one or more recursion(s) of the method which have a defined or known spatial-temporal relation to a current recursion of the method. For example, the multiple views may correspond to a frame of a video stream, the frame being associated to a certain instance of time t0. Moreover, assume a 3D spatio-temporal object occupying a certain 3D space within the 3D scene at the instance t0. It is relatively likely that the 3D spatio-temporal object was not very far away from a current position at a previous instance t1. It is also relatively likely that the shape of the 3D spatio-temporal object has a similar shape at the instances t0 and t−1. Therefore, the 3D spatio-temporal object which corresponds to the resulting hypothesis (final hypothesis in FIG. 2) may typically assumed to provide a good starting point for the provision of the at least two hypotheses for the 3D-information and/or the action of updating the test-result hypothesis. For example, the hypotheses provided to the multi-hypotheses test may be located around the previous resulting hypothesis in a parameter space, within a defined measure of distance of the parameter space. Besides exploiting a temporal relation between the current recursion and the previous recursion(s), a spatial relation may also be used. A spatial relation may be given if a first 3D object is spatially close to a second 3D object in the 3D scene. For example, the first and second 3D objects may both be adjacent portions of a common 3D surface. Accordingly, the resulting hypotheses corresponding to the first 3D object may be spatially translated to the position of the second 3D object in order to provide one of the at least two hypotheses provided to the multi-hypotheses test so that the multi-dimensional parameter interval contains one or more previously determined spatio-temporal parameter set(s) for the one more previously processed segment(s) of the 3D scene. The selected hypotheses may span a multi-dimensional parameter interval for the multi-hypotheses test which may comprise, for example, a determination of projections of hypothesis-related 3D objects onto image planes of the multiple images and a correspondence analysis.

Figure 3:
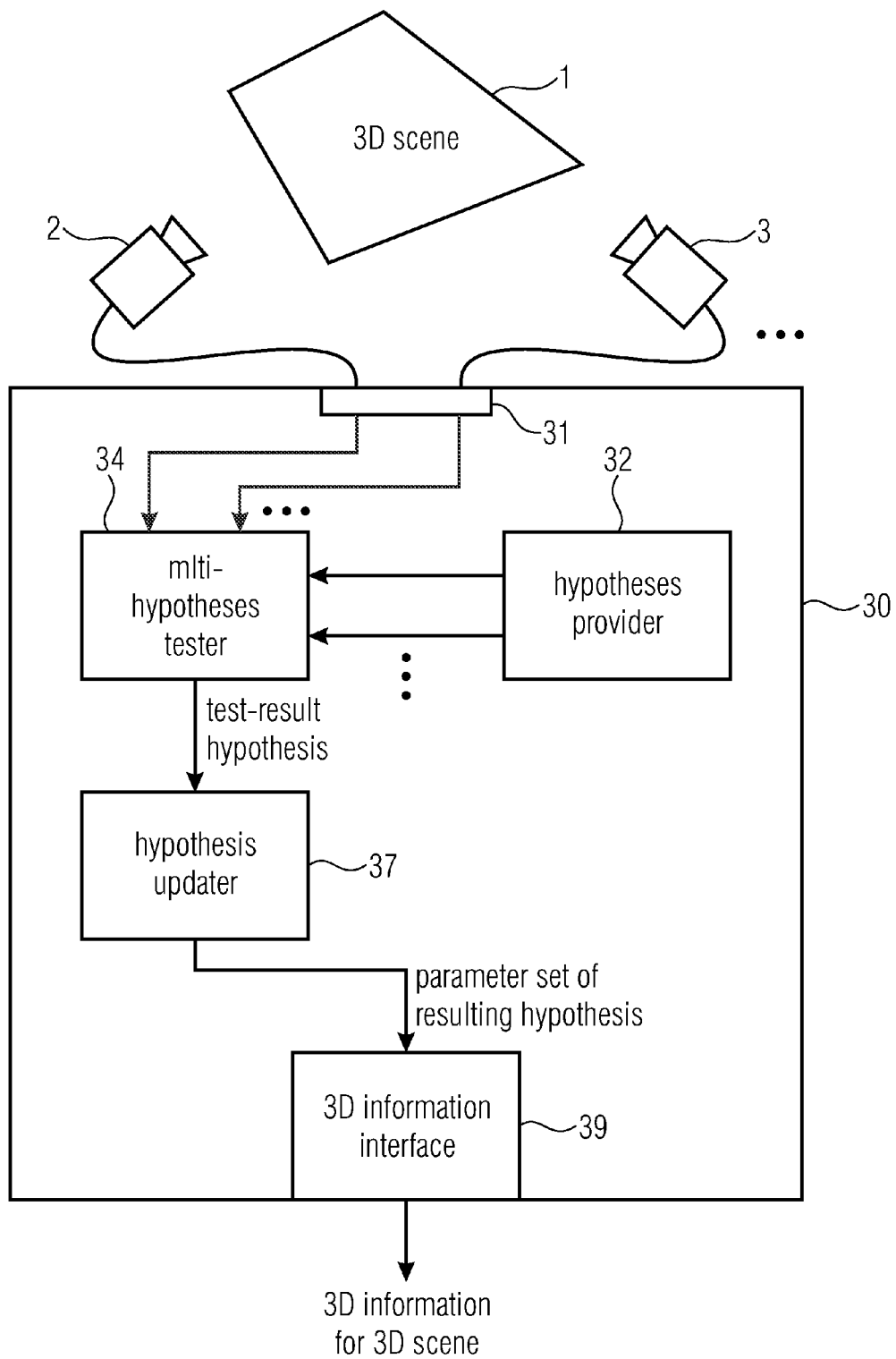
FIG. 3 shows a schematic block diagram of a 3D-information generator according to some embodiments.

FIG. 3 shows a schematic block diagram of a 3D-information generator 30. The 3D-information generator 30 is intended to generate 3D-information about a 3D scene 1. In FIG. 3, two camera 2, 3 provide two respective images of the 3D scene 1, i.e. multiple images showing the 3D scene from multiple perspectives. The 3D-information generator 30 comprises an interface 31 for receiving the multiple images. The 3D-information generator 30 further comprises a hypotheses provider 32 that is configured to provide at least two hypotheses for the 3D-information. The 3D-information generator 30 also comprises a multi-hypothesis tester 34 for performing a multi-hypothesis test by matching the at least two hypotheses to the multiple images and determining a test result hypothesis that fulfills a particular matching criterion. The test-result hypothesis is forwarded to a hypothesis updater 37 that is configured to update the test-result hypothesis by varying a parameter set off the test result hypothesis to further improve a fulfillment of the matching criterion or another criterion. On the basis of the parameters set of a resulting hypothesis provided by the hypothesis updater 37, a 3D-information interface 39 is configured to provide the 3D-information corresponding to the parameter set of the resulting hypothesis.

It may be possible, in some embodiments, that the hypothesis updater 37 provides the resulting hypothesis to the hypothesis provider 32 so that the resulting hypotheses can be provided to the multi-hypo thesis tester 34 during a subsequent recursion performed by the 3D-information generator 30.

According to a further aspect of the teachings disclosed herein, a method for generating 3D information from multiple images showing a 3D scene from multiple perspectives comprises providing a plurality of spatio-temporal object parameter sets, each spatio-temporal parameter set comprising object parameters describing the 3D spatio-temporal object of a plurality of 3D spatio-temporal objects. This provision of the spatio-temporal object parameter sets may be performed by a parameter set provider 42 of a 3D-information generator. 40, as schematically illustrated in block diagram form in FIG. 4. The provision may comprise a retrieval of selected parameter sets of a previous recursion of the method from a hypotheses memory. As the previous recursion has a defined or known spatial and/or temporal relation to the current recursion, the selected parameter sets provide a reasonable input for the multi-hypotheses tester, when the spatial and/or temporal relation has been taken into account by, for example spatially translating, re-orienting (rotating), and/or deforming the 3D spatio-temporal object which corresponds to the resulting hypothesis (final hypothesis) of the previous recursion. This may be achieved by a recursive selection scheme that takes into account at least one of spatial and temporal dependencies/relations between one or more previously processed segment(s) and a current segment of the 3D scene.

Figure 4:
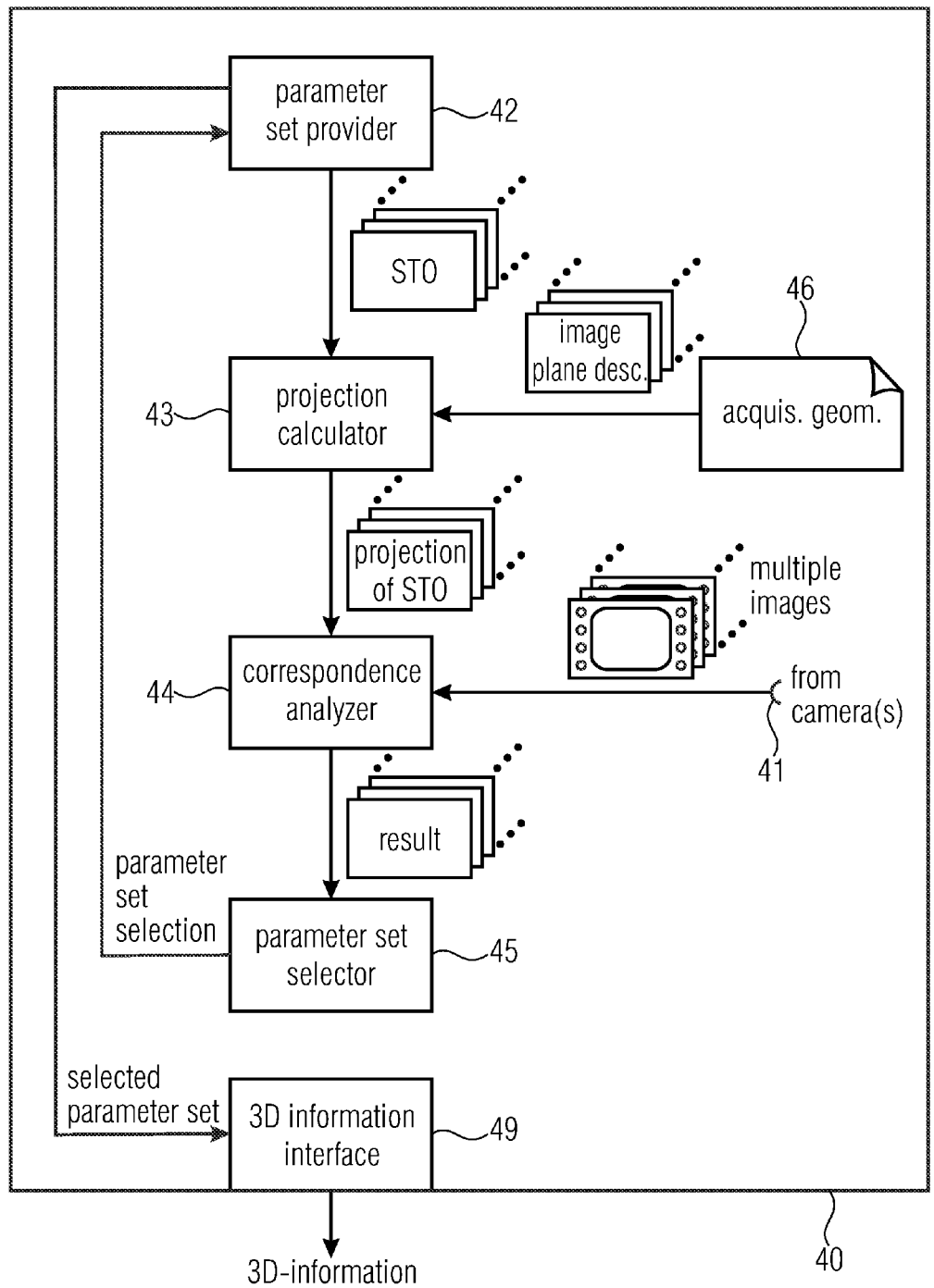
FIG. 4 shows a schematic block diagram of a 3D-information generator according to further embodiments.

The method further comprises a determination of projections (for example, by means of a projection calculator 43) of the plurality of spatio-temporal objects on a plurality of image planes corresponding to the multiple images using the plurality of spatio-temporal object parameter sets. The image planes may be described by image plane descriptions provided by data record 46 describing the acquisition geometry. Then a performance analysis between the projections in the multiple images is performed. A particular spatio-temporal object parameter set is selected from the plurality of spatio-temporal object parameter sets on the basis of the a result of the correspondence analysis. The actions of determining the projections, of performing the correspondence analysis (for example, using a correspondence analyzer 44, as shown in FIG. 4), and of selecting the particular spatio-temporal object parameter set may be regarded as a multiple-hypotheses test, which may be achieved by a parameter set selector 45 of the 3D-information generator. The 3D-information may then be provided by means of a 3D-information interface 49, on the basis of the object parameters of the particular spatio-temporal parameter set.

Each of 3D spatio-temporal objects may be regarded as a hypothesis. The plurality of spatio-temporal parameter sets therefore corresponds to a plurality of hypotheses for a spatially and temporally limited segment of the 3D scene. The plurality of hypotheses may then be analyzed by means of the multi-hypotheses test.

Aspects of at Least Some Embodiments

3D Spatio-Temporal Objects (STO)
    A STO is an arbitrary shaped object in the 3D space
    A STO may consist on a 3D position, 3D orientation, material properties such as transparency and surface reflectance
    A STO is time dependent and therefore a deformable 3D object Hypothesis Definition
    A hypothesis is represented by a STO
    STOs are defined by a given parameter vector Replacement of Block Matching by a Patch Sweep Based Approach
    Each hypothesis represented by a STO is projected to the image planes of two or multiple cameras
    The STO projections in the images planes may be simplified versions
    The probability of a given hypothesis is determined by correspondence analysis of the projections of the STO in the image planes for two or multiple images simultaneously Hypothesis Selection and Refinement
    The best hypothesis is selected based on hypothesis confidence
    The hypothesis update is performed by a multi-dimensional parameter optimization of the parameter vector of a given hypothesis
    The optimization criteria is the related hypothesis confidence, describing the existence probability of a hypothesis Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for generating 3D-information from multiple images showing a 3D scene from multiple perspectives, the method comprising:
    providing at least two hypotheses for the 3D-information;
    performing a multi-hypotheses test by matching the at least two hypotheses to the multiple images and determining a test-result hypothesis that fulfills a particular matching criterion by selecting one of the at least two hypotheses as the test result hypothesis, wherein the multi-hypotheses test comprises determining projections of at least two 3D spatio-temporal objects defined by the at least two hypotheses on a plurality of image planes corresponding to the multiple images and performing a correspondence analysis between the projections in the multiple images to determine the test-result hypothesis;

updating the test-result hypothesis by varying a parameter set of the test-result hypothesis to further improve the matching criterion or another criterion, the parameter set comprising at least one of a 3D position, a 3D orientation, a deformation, and material properties;

determining the 3D-information on the basis of the parameter set of a resulting hypothesis provided by the action of updating the test-result hypothesis; and repeating the steps of providing, performing and updating as a subsequent iteration, wherein the step of providing in the subsequent iteration comprises deriving at least one of the at least two hypotheses for the 3D-information from the resulting hypothesis provided by the action of updating the test-result hypothesis preceding the subsequent iteration, wherein the deriving comprises at least one of spatially translating, re-orienting and deforming the 3D spatio-temporal object of the resulting hypothesis provided by the action of updating the test-result hypothesis preceding the subsequent iteration.

2. The method according to claim 1, wherein the action of updating the test-result hypothesis further comprises:

comparing an updated test-result hypothesis and the test-result hypothesis with respect to the particular matching criterion or a further matching criterion; and choosing the updated test-result hypothesis or the test-result hypothesis as the resulting hypothesis in dependence on a result of the comparison.

3. The method according to claim 1, wherein the provision of the at least two hypotheses comprises retrieving selected hypotheses relative to one or more previous recursion(s) of the method from a hypotheses memory, the one or more previous recursion(s) comprising a defined or known spatial and temporal relation to a current recursion of the method.

4. The method according to claim 3, wherein the retrieved selected hypotheses are a result of a recursion of the one or more previous recursion(s) thereby establishing a feed-back loop that includes the step of performing and the step of updating.

5. The method according to claim 1, wherein the update of the test-result hypothesis comprises a multi-dimensional parameter optimization of the parameter set of the test-result hypothesis.

6. The method according to claim 1, wherein the update of the test-result hypothesis comprises a recursive determination of parameter variations on the basis of at least one or more of:

a test-result hypothesis determined during a previous recursion of the method and an updated test-result hypothesis determined during the previous recursion.

7. The method according to claim 1, wherein the particular matching criterion is at least one of a hypothesis confidence and a probability of a given hypothesis.

8. The method according to claim 1, wherein the projections of the at least two 3D objects are simplified versions.

9. The method according to claim 1, wherein the at least two hypotheses define at least one of the 3D position, the 3D orientation, a material property, and a surface reflectance of at least two corresponding 3D spatio-temporal objects.

10. The method according to claim 1,
wherein the at least two hypotheses define at least two 3D spatio-temporal objects; and
wherein the update of the test-result hypothesis comprises updating the parameter set according to the deformation of a corresponding 3D spatio-temporal object between a previous recursion and a current recursion of the method, the previous recursion regarding a temporally previous version of the corresponding 3D spatio-temporal object.

11. The method according to claim 1, wherein within the multi-hypotheses test a relatively small number of hypotheses is evaluated.

12. The method according to claim 1, wherein at least one of the at least two hypotheses is a result of a recursion, the recursion including the step of performing and the step of updating, thereby establishing a feed-back loop.

13. The method according to claim 1, wherein the deriving is performed so that at least two of the at least two hypotheses for the 3D-information are derived from the resulting hypothesis provided by the action of updating the test-result hypothesis preceding the subsequent iteration.

14. The method according to claim 1, wherein the step of providing in the subsequent iteration includes deriving at least a further one of the at least two hypotheses for the 3D-information from 3D information concerning a previous video frame.

15. A non-transitory computer readable digital storage medium having stored thereon a computer program comprising a program code for performing, when running on a computer, a method for generating 3D-information from multiple images showing a 3D scene from multiple perspectives, the method comprising:

providing at least two hypotheses for the 3D-information;

performing a multi-hypotheses test by matching the at least two hypotheses to the multiple images and determining a test-result hypothesis that fulfills a particular matching criterion by selecting one of the at least two hypotheses as the test result hypothesis, wherein the multi-hypotheses test comprises determining projections of at least two 3D spatio-temporal objects defined by the at least two hypotheses on a plurality of image planes corresponding to the multiple images and performing a correspondence analysis between the projections in the multiple images to determine the test-result hypothesis;

updating the test-result hypothesis by varying a parameter set of the test-result hypothesis to further improve the matching criterion or another criterion, the parameter set comprising at least one of a 3D position, a 3D orientation, a deformation, and material properties;

determining the 3D-information on the basis of the parameter set of a resulting hypothesis provided by the action of updating the test-result hypothesis; and repeating the steps of providing, performing and updating as a subsequent iteration, wherein the step of providing in the subsequent iteration comprises deriving at least one of the at least two hypotheses for the 3D-information from the resulting hypothesis provided by the action of updating the test-result hypothesis preceding the subsequent iteration, wherein the deriving comprises at least one of spatially translating, re-orienting and deforming the 3D spatio-temporal object of the resulting hypothesis provided by the action of updating the test-result hypothesis preceding the subsequent iteration.

16. A 3D-information generator comprising:

an interface that receives multiple images showing a 3D scene from multiple perspectives;

a hypotheses provider that provides at least two hypotheses for the 3D-information;

a multi-hypotheses tester that performs a multi-hypotheses test by matching the at least two hypotheses to the multiple images and determining a test-result hypothesis that fulfills a particular matching criterion by selecting one of the at least two hypotheses as the test result hypothesis, the multi-hypotheses tester comprising a projection calculator for determining projections of at least two 3D spatio-temporal objects defined by the at least two hypotheses on a plurality of image planes corresponding to the multiple images, and a correspondence analyzer that performs a correspondence analysis between the projections in the multiple images to determine the test result hypothesis;

a hypothesis updater that updates the test-result hypothesis by varying a parameter set of the test-result hypothesis to further improve a fulfillment of the matching criterion or another criterion, the parameter set comprising at least one of a 3D position, a 3D orientation, a deformation, and material properties; and a 3D-information interface that provides the 3D-information on the basis of the parameter set of a resulting hypothesis provided by the hypothesis updater; wherein the 3D-information generator is configured so that, as a subsequent iteration, the hypotheses provider repeats the provision, the multi-hypotheses tester repeats the provision, and the hypothesis updater repeats the update;

the hypothesis provider is configured to, in the subsequent iteration, derive at least one of the at least two hypotheses for the 3D-information from the resulting hypothesis provided by the action of updating the test-result hypothesis preceding the subsequent iteration, wherein the deriving comprises at least one of spatially translating, re-orienting and deforming the 3D spatio-temporal object of the resulting hypothesis provided by the action of updating the test-result hypothesis preceding the subsequent iteration; and each of the hypotheses provider, multi-hypotheses tester, and hypothesis updater is implemented on a computer, a microprocessor, or an electronic circuit.

17. The 3D-information generator according to claim 16, wherein the hypothesis updater comprises a hypotheses comparator that compares the updated test-result hypothesis and the test-result hypothesis, wherein the resulting hypothesis is chosen among the updated test-result hypothesis and the test-result hypothesis in dependence on an output of the comparator.

18. The 3D-information generator according to claim 16, further comprising a hypotheses memory that stores hypotheses relative to one or more previous recursion(s) of the method, wherein the hypotheses provider is further configured that retrieves selected hypotheses from the hypotheses memory, the selected hypotheses being related to one or more previous recursion(s) comprising a defined or known spatial and temporal relation to a current recursion of the method.

19. The 3D-information generator according to claim 16, wherein the hypothesis updater comprises a multi-dimension parameter optimizer that optimizes the parameter set of the test-result hypothesis.

20. The 3D-information generator according to claim 16,
wherein the at least two hypotheses define at least two 3D spatio-temporal objects; and
wherein the hypothesis updater updates the parameter set according to the deformation of a corresponding 3D spatio-temporal object between a previous recursion and a current recursion, the previous recursion regarding a temporally previous version of the corresponding 3D spatio-temporal object.

* * * * *